Patented Dec. 15, 1931

1,836,526

UNITED STATES PATENT OFFICE

RUDOLF CLÉMENT, OF COLOGNE-BRAUNSFELD, AND WALTHER VOSS, OF COLOGNE-KLETTENBERG, GERMANY, ASSIGNORS TO VULCAN-FEUERUNG AKTIENGESELLSCHAFT, OF COLOGNE, GERMANY

OPERATION OF LIME AND DOLOMITE KILNS AND FURNACES

No Drawing. Application filed July 5, 1929, Serial No. 376,272, and in Germany November 26, 1928.

The invention relates to a process for improving the operation of lime and dolomite kilns or furnaces, and is particularly but not exclusively applicable to those with a vertical shaft and continuous operation. It has already been proposed to supply steam to the interior of a lime kiln, the steam being generated either outside or inside the kiln, in the latter case in such a manner that liquid water is led into the interior of the kiln and vapourized by the surrounding heat therein before actually entering into operation. Even if this takes place in the sintering or burning zone, the action is not the same as if the water reaches the glowing limestone and burning coke in the liquid condition.

In order to ensure this mode of operation with the water, according to the invention the water led into the sintering or burning zone is previously cooled in such a manner that its vapourization is reliably avoided. The water all in liquid form coming into contact with the glowing limestone has the same action but to a very considerably increased degree, as steam, namely the decomposition of the limestone, the accelerated expulsion of the carbon dioxide and the prevention of dead burning of the material. At the same time the part of the water falling on the glowing coke acts, in the manner known in cupola and blast furnaces, advantageously on the combustion processes and acts moreover in a much better manner than steam, with the result that the consumption of coke is directly reduced. To this direct decrease in coke consumption must be added the indirect decrease due to the accelerated expulsion of the carbon dioxide from the limestone. Advantageously cooling of the limestone which acts as a protection against dead burning at the hottest place, takes place due to heat becoming latent and this latent heat is not lost nor does it act harmfully, since it causes almost complete decomposition of the liquid water with almost complete avoidance of vapourization, into ogygen and hydrogen, that is the immediate production of gases which support the combustion processes of the coke or other carbonaceous material. In any case the final result is a considerable acceleration of the burning process and a considerable reduction of fuel consumption.

The cooling of the supplied water can take place in any desired manner. The water fed to the burning zone is always cooled down to almost 0° C. In case it must be so arranged that the water remains liquid right up to its contact with the glowing contents of the kiln, that is, the water must be sufficiently cold not to be vapourized by the surrounding heat as it flows out of the mouthpiece.

Advantageously the water is sprayed at its outflow from the mouthpiece, the simplest way of effecting which is to make the mouthpiece sufficiently small and to supply the water under a certain pressure. Such spraying facilitates vapourization and cooling of the water is then all the more necessary.

What we claim is:—

A method of improving the operation of limestone and dolomite furnaces and kilns, which consists in supplying water to the burning zone, the water being cooled to such a degree that it comes into contact with the limestone and carbonaceous material contained in the burning zone in a liquid condition.

In testimony whereof we have signed our names to this specification.

RUDOLF CLÉMENT.
WALTHER VOSS.